United States Patent [19]

Cawiezel

[11] Patent Number: 4,816,166

[45] Date of Patent: Mar. 28, 1989

[54] FLOCCULATION OF COAL PARTICLES AND COAL SLIMES

[75] Inventor: Kay E. Cawiezel, Broken Arrow, Okla.

[73] Assignee: The Dow Chemical Company, Midland, Mich.

[21] Appl. No.: 546,768

[22] Filed: Oct. 31, 1983

[51] Int. Cl.$^4$ ............................................. C02F 1/56
[52] U.S. Cl. ..................................... 210/727; 210/734
[58] Field of Search ............................... 210/726–729, 210/733–735

[56] References Cited

U.S. PATENT DOCUMENTS 3,692,673  9/1972  Hoke ................................. 210/728
4,251,363  2/1981  Chamberlain et al. ............. 210/727

Primary Examiner—Tom Wyse

[57] ABSTRACT

An improved process for flocculating and clarifying colloidal coal slurries comprises contacting a coal liquor with a water-soluble, low molecular weight polymer with high anionic character; an inorganic coflocculant; and a water-soluble high molecular weight polymer with low anionic character. The low molecular weight polymer contains at least 50 mole percent nonionic monomer. The process allows coal liquor clarification to be performed using low total polymer dosages.

10 Claims, No Drawings

FLOCCULATION OF COAL PARTICLES AND COAL SLIMES

BACKGROUND OF THE INVENTION

This invention relates to methods for clarifying coal liquors or slurries by employing water-soluble polymers.

Clarification of coal liquors or slurries is an important aspect in the economy of operating a coal production plant. Generally, such plants are operated on a closed system basis in that the water used to wash the raw coal is recycled for reuse. Since such water serves primarily to remove coal fines and clays mixed with the raw coal thereby forming coal liquors, it is critical that the water be relatively clear and contain only minor amounts of suspended solids when it is reused in the washing procedure. Otherwise, undesirable large volumes of water would be necessary to process the coal. Since the coal fines and clay which are removed from these coal liquors are often used as filler materials and in other applications which require inexpensive inert materials, it is essential that such coal liquor clarification be very inexpensive.

Previously, the coal industry has employed various anionic and cationic, water-soluble polymers to remove both coal particles and colloidal clay particles. For example, as taught in U.S. Patent No. 3,408,293, it is a common practice to prefloc the coal liquor or coal slurry with anionic polymers in order to flocculate the coal particles and subsequently treat the prefloc slurry with cationic polymer in order to coagulate the remaining clay and/or coal particles. Unfortunately, very careful control over the quantities of anionic and cationic polymers employed must be exercised in order to obtain efficient clarification of the coal liquor. Also, significant quantities of the various polymers need to be employed in order to achieve such desirable coal liquor clarification.

Colloidal coal particles in aqueous alkaline medium are flocculated by the combined action of a low molecular weight water-soluble anionic polymer which contains at least 50 mole percent acrylic acid linkages, and a high molecular weight anionic polymer containing at least 95 mole percent acrylamide, as disclosed in U.S. Patent No. 3,717,574. Water-soluble anionic starches are also disclosed to be supplementary flocculants. Unfortunately, the treatment of a coal slurry with such a polymer system can result in a partially flocculated slurry having unflocculated coal particles suspended in the aqueous medium.

In view of the foregoing deficiencies of the prior art procedures for coal liquor clarification, it is highly desirable to provide a method which allows for effective and efficient flocculation causing removal of substantially all collidal coal from the aqueous media while employing a relatively low flocculant dosage.

SUMMARY OF THE INVENTION

The present invention is a process for flocculation of a colloidal coal slurry wherein a coal liquor is contacted with a clarifying amount of flocculant treating agents comprising:

(A)
(1) a water-soluble, low molecular weight polymer having a substantially high anionic character comprising in polymerized form at least one nonionic water-soluble monomer and at least one water-soluble monomer containing an anionic moiety, wherein the anionic character is such that the nonionic monomer comprises at least about 50 mole percent of said polymer, which polymer is contacted with said coal liquor, and (2) an inorganic coflocculant which is contacted with said coal liquor, wherein the amount of said inorganic coflocculant is sufficient to increase the flocculating capability of said polymer; and the amount of said polymer and the anionic character thereof are such that the flocculating capability is provided, and (B) a further clarifying amount of a water-soluble, high molecular weight polymer having a nonionic or weakly anionic character comprising in polymerized form a nonionic, water-soluble monomer and, optionally at least one water-soluble monomer containing an anionic moiety.

Surprisingly, it is found that in the practice of this invention, coal liquor clarification can be performed more efficiently using lower total polymer dosages than is required using prior art techniques. That is, excellent removal of colloidal coal and/or clay from the aqueous media can be achieved. The process of this invention also allows one to flocculate coal liquors and achieve better settling rates and compaction.

DETAILED DESCRIPTION OF THE INVENTION

For the purposes of this invention, the term "coal liquor" is meant to include such aqueous suspension of coal particles, such as particles of hard coal such as anthracite; as well as soft coal such as lignite, mixtures thereof, and the like. Such suspensions advantageously contain from about 0.25 to about 50, preferably from about 2 to about 30, most preferably from about 2 to about 10, weight percent of total solids. Such liquors contain coal particles and very often contain colloidal-size clay particles wherein the proportion of clay to coal can vary from about 95:5 to about 5:95, usually from about 80:20 to about 20:80 on a weight basis.

Low molecular weight polymers which are substantially strongly anionic in character are those which are relatively strongly anionic as compared to the high molecular weight anionic polymers which are also employed herein. Such low molecular weight polymers are generally copolymers of nonionic, water-soluble monomers such as acrylamide and methacrylamide with ethylenically unsaturated monomers containing anionic moieties, or partially hydrolyzed acrylamide polymers. Examples of such anionic moieties include carboxylate moieties such as those obtained from hydrolyzing monomers such as acrylamide, methacrylamide; acrylonitrile or esters of acrylic acid; those obtained from copolymerizing an unsaturated carboxylic acid such as acrylic acid or methacrylic acid; or those obtained from copolymerizing an anionic monomer such as a sulfonic acid containing monomer such as 2-acrylamido-2-methylpropane sulfonic acid. It is necessary that the low molecular weight polymer not have the anionic equivalent of more than about 50 mole percent, preferably less than about 45 mole percent hydrolyzed polyacrylamide. Preferably, the low molecular weight polymer which is substantially strongly anionic in character comprises about 20 to about 45, preferably about 30 to about 45, more preferably about 35 to about 45, most preferably about 40 to about 45, mole percent of the anionic equivalent of hydrolyzed polyacrylamide; an about 55 to about 80, preferably about 55 to about 70, more preferably about 55 to about 65, and most preferably about 60 to about 55 mole percent acrylamide. Similarly, preferred polymers comprise from about 20 to about 45 mole percent acrylic acid or methacrylic acid, and about 55 to about 80 mole percent acrylamide. Also desirable are polymers comprising from about 55 to about 80, preferably about 55 to about 65, most preferably about 55 to about 60, mole percent acrylamide, about 0 to about 45 mole percent 2-acrylamido-2-methyl propane sulfonic acid, and about 0 to about 45 mole percent hydrolyzed acrylamide such that the amount of sulfonic acid plus hydrolyzed acrylamide is at least 20 mole percent of said polymer. The molecular weight of this low molecular weight polymer can vary and range from about 500,000 to about 1,500,000, preferably from about 500,000 to about 1,000,000, most preferably from about 600,000 to about 750,000.

The high molecular weight polymers which can, if desired, be weakly anionic in character are those which are copolymers of nonionic, water-soluble monomers and ethylenically unsaturated monomers containing anionic moieties as previously described. Preferably, the high molecular weight polymer comprises about 0 to about 10, preferably about 2 to about 10, most preferably about 4 to about 7, mole percent monomer containing anionic moiety, which is most preferably hydrolyzed acrylamide. The amount of anionic character of this polymer involves a balance of two factors. That is, a low amount of anionic character (i.e., about 0 to about 2 weight percent monomer containing anionic moiety) yields an aqueous system having good clarity but at the expense of settling rate and compaction. Conversely, a relatively high amount of anionic character (i.e., about 8 to about 10 weight percent monomer containing anionic moiety) yields an aqueous system having poorer clarity but good settling rates and compaction properties. The molecular weight of the high molecular weight polymer can vary and is advantageously in excess of about 5 million, preferably in excess of about 8 million. A polymer having a molecular weight of from about 8 to about 15 million yields relatively fast settling rates.

Polymers are prepared by using techniques known in the art for preparing water-soluble polymers. For example, polymerization can be carried out in aqueous medium in the presence of a small but effective amount of a water-soluble oxygen-containing catalyst at a temperature of from about 80° F. to about 190° F. The resulting polymer is recovered from the aqueous medium, as by drum drying or precipitation, and can be subsequently ground to the desired particle size. The particle size should be fine enough to facilitate the dispersion of the polymer in water. Polymers are prepared ussing emulsion polymerization techniques described in U.S. Patent Nos. 3,284,393; 4,376,855 and U.S. Patent RE 28,474, which are incorporated herein by reference. Most preferably, the low molecular weight polymers are prepared using solution polymerization techniques, and the high molecular weight polymers are prepared using emulsion polymerization techniques.

The inorganic coflocculant as used herein can be any of those inorganic coflocculants as are known in the art. Preferably, the inorganic coflocculant is an inorganic coagulant and can include aluminum sulfate, sulfuric acid or ferric chloride. Hydrochloric acid, sodium chloride and calcium chloride are also preferred.

In practice, the coal liquor is contacted with an amount of the low molecular weight polymer. In preferred embodiments wherein the coal liquor can also contain suspended clay particles, the polymer is added in amounts sufficient to remove both suspended coal particles and clay particles from the aqueous media. Preferably, such amounts of active polymer range from about 0.5 to about 120, preferably from about 15 to about 30, weight parts of polymer per million weight parts of coal liquor. The mode of adding the polymer to the coal slurry is not particularly critical as long as a uniform dispersion of the polymer in the coal slurry is achieved. However, it is preferable that excess or unnecessary agitation of the dispersion be kept to a minimum.

The coal liquor is contacted with an amount of inorgaic coflocculant. The amount of inorganic coflocculant can vary and is generally from about 100 to about 2,000, preferably from about 100 to about 1000, most preferably from about 500 to about 850, weight parts per million weight parts of coal liquor. Generally, the amount of inorganic coflocculant is sufficient to lower the pH of the slurry to the range from about 4.8 to about 6.0 when the coflocculant is an acid (e.g., sulfuric acid), and to the range from about 5.3 to about 6.3 when the coflocculant is a salt (e.g., aluminum sulfate). The higher the level of anionic character of the high molecular polymer, the greater the amount of inorganic coflocculant which can be employed. It is possible to first contact the coal liquor with the inorganic coflocculant and then with the low molecular weight polymer, although much higher levels of polymer and coflocculant dosages will generally be required. It is most preferable to contact the coal liquor with the low molecular weight polymer, and then contact the coal liquor with the inorganic coflocculant.

The coal liquor is then contacted with an amount of the high molecular weight polymer. Preferably, such amounts of active polymer range from about 0.5 to about 120, preferably about 30 to about 60, weight parts per million weight parts of coal liquor.

The time intervals at which each of the three critical components of the flocculant treatment are added relative to coal liquor are not particularly critical as long as there is provided sufficient time to adequately disperse each respective component of the flocculant treatment in the coal liquor before the next component is added. Typically, dispersion times can range from a few seconds to several minutes.

Actual dosage ranges for both polymeric flocculants and the inorganic coagulant depend upon the characteristics of the slurry. Such characteristics include percent solids, particle size range, size, surface characteristics of solids, pH of the slurry, and prior chemical treatment. As the percent solids increase, the polymer dosage required usually shows more than a proportional increase. As the particle size range shows an increasingly higher percentage of very fine particles, the inorganic coagulant dosage required usually increases and the amount of polymer required for flocculation should also increase. Surface characteristics of the solids, such as particle zeta potential and hydrophobicity of particle surface, will influence the chemical dosages depending upon degree of electronegativity and hydrophobicity. The pH of the slurry also affects chemical dosages required, with higher pH ranges requiring more inorganic coagulant and more polymer to flocculate. Optimum pH ranges for different coagulants are noted herein. Prior chemical treatment may increase or decrease chemical dosage requirements depending on the type and amount of chemical added prior to this flocculation step.

In the practice of this invention, it is found that the coal liquors can be clarified to a level such that the transmittance of light through the liquor is often in excess of 75 percent and under preferred conditions is in excess of 85 percent. In addition, it is also found that settling rates and the degree of compaction are significantly improved at lower total polymer dosages by practicing the present invention as compared to prior art procedures utilizing conventional cationic or anionic polymers.

The following examples are given for the purposes of illustrating the present invention and should not be construed as limiting its scope. Unless otherwise indicated, all parts and percentages are by weight.

EXAMPLE 1

Coal-clay suspensions obtained from various coal preparation plants are dispersed in tap water to 5.8 percent solids at a pH of 8.05 at 70° F.

Each of the polymer flocculants is diluted to a concentration of 0.25 percent (active polymer weight) and allowed to equilibrate. The resulting solutions are then diluted to a concentration of 0.025 percent immediately before use.

A 250-ml portion of the mixed coal liquor is poured into a 500 ml volumetric cylinder. An amount of each 0.025 percent flocculant solution and the inorganic coflocculant solution, as indicated hereinafter, are added to the liquor and then the cylinder is stoppered. The cylinder is rotated end-over-end 4 consecutive times, set in front of a light source and unstoppered.

The average floc size, the time for the solid liquid interface to settle to various levels and clarity of the supernatant liquid at the end of 3 minutes is determined and recorded in Table I. Clarity of the supernatant liquid is determined using a Hach Chemical Company Spectrophotometer. Clarity is defined in terms of percent of light transmittance using light having a wave length of 450 nanometers.

Relative performance of the various polymer flocculants is calculated according to the following equation: relative performance equals the performance of the test polymer divided by the performance of a standard polymer wherein Polymer performance is equal to (7.8) times (the clarity of the supernatant in percent transmittance at 3 minutes) times (the square root of the sum of 1 plus the settling rate of the solids in inches per minutes) divided by (the concentration of the active polymer flocculent in parts per million based on the weight of the coal liquor times the square root of the square root of the height (inches) of the compacted column after 3 minutes).

A partially (43 mole percent) hydrolyzed acrylamide polymer (Polymer A) having a weight average molecular weight of 600,000 is prepared in accordance with conventional solution polymerization techniques, and is tested for flocculating capability for coal liquors.

A copolymer of 95 mole percent acrylamide and 5 mole percent hydrolyzed acrylamide (Polymer B) having a weight average molecular weight of 10 million is prepared in accordance with the teachings of U.S. Patent RE 28,474.

Following the foregoing procedure, Polymer A is added to the slurry. After dispersion of Polymer A into the slurry, to the slurry is added 0.8 ml to 1.6 ml of a 25 percent solution of aluminum sulfate (Alum). After gentle agitation, Polymer B is added to the slurry. Description of the amounts of each polymer added, amount of Alum added, amount of hydrolysis of Polymer A, and data concerning settling rate, clarity and compaction is presented in Table I.

TABLE I

| Sample No. | Alum Conc. (ppm) | Percent Hydrolysis Polymer A | Polymer A (ppm) | Polymer B (ppm) | Percent Light Transmittance | Settling Rate (in./min.) | Compaction (in.) | Performance |
| --- | --- | --- | --- | --- | --- | --- | --- | --- |
| C-1* | 800 | 16 | 80 | 60 | N.M. | N.M. | N.M. | N.M. |
| 1 | 800 | 34 | 80 | 60 | 48 | 3.35 | 6.18 | 3.54 |
| 2 | 800 | 43 | 80 | 60 | 47 | 2.79 | 6.49 | 3.17 |
| 3 | 800 | 48 | 80 | 60 | 36 | 2.64 | 7.01 | 2.35 |
| C-2* | 800 | 16 | 120 | 60 | 11 | 0.98 | 9.57 | 0.38 |
| 4 | 800 | 34 | 120 | 60 | 33 | 3.22 | 7.28 | 1.79 |
| 5 | 800 | 43 | 120 | 60 | 38 | 3.93 | 6.69 | 2.28 |
| 6 | 800 | 48 | 120 | 60 | 24 | 3.58 | 6.93 | 1.37 |
| C-3* | 1600 | 16 | 80 | 40 | N.M. | N.M. | N.M. | N.M. |
| 7 | 1600 | 34 | 80 | 40 | 79 | 1.22 | 7.68 | 4.61 |
| 8 | 1600 | 43 | 80 | 40 | 80 | 1.57 | 7.40 | 5.04 |
| C-4* | 1600 | 48 | 80 | 40 | 79 | 1.18 | 7.80 | 4.55 |

*Not an example of the invention.
N.M. denotes not measurable as the settling rate is very poor.

The data in Table I indicates that good flocculating performance is obtained for those suspensions treated with Polymer A having an amount of hydrolysis from about 34 to about 45 mole percent.

EXAMPLE 2

Coal/clay suspensions are dispersed in water as described in Example 1.

Each of the polymer flocculant is diluted to a concentration of 0.1 percent (active polymer weight) and allowed to equilibrate. Various combinations of polymer flocculants and inorganic coflocculants are added to a coal liquor sample and tested as in Example 1. Data concerning settling rate, clarity and compaction is presented in Table II.

TABLE II

| Sample No. | Flocculant 1 Type | Flocculant 1 Dosage (ppm) | Flocculant 2 Type | Flocculant 2 Dosage (ppm) | Flocculant 3 Type | Flocculant 3 Dosage (ppm) | Transmittance @ 20 min. | Settling Rate (in/min.) | Compaction (in.) | Performance |
|---|---|---|---|---|---|---|---|---|---|---|
| C-5* | H2SO4 | 550 | — | — | — | — | N.M. | N.M. | N.M. | N.M. |
| C-6* | LMW | 46 | — | — | — | — | N.M. | N.M. | N.M. | N.M. |
| C-7* | HMW | 55 | — | — | — | — | N.M. | N.M. | N.M. | N.M. |
| C-8* | LMW | 23 | HMW | 28 | — | — | N.M. | N.M. | N.M. | N.M. |
| C-9* | LMW | 46 | H2SO4 | 550 | — | — | N.M. | N.M. | N.M. | N.M. |
| C-10* | HMW | 55 | H2SO4 | 550 | — | — | N.M. | N.M. | N.M. | N.M. |
| C-11* | LMW | 23 | HMW | 28 | H2SO4 | 550 | N.M. | N.M. | N.M. | N.M. |
| C-12* | H2SO4 | 550 | LMW | 23 | HMW | 28 | <20 | 1.5 | N.M. | N.M. |
| 9 | LMW | 23 | H2SO4 | 550 | HMW | 28 | 58 | 2.75 | 2.5 | 13.7 |
| 10 | LMW | 23 | H2SO4 | 550 | HMW | 28 | 82 | 3.25 | 2.5 | 20.5 |
| 11 | A | 21 | H2SO4 | 550 | B | 29 | 98 | 0.4 | 3.75 | 13.0 |
| 12 | A | 21 | H2SO4 | 550 | B | 38 | 86 | 1.0 | 2.75 | 12.4 |

*Not an example of the invention.
N.M. denotes not measurable due to very poor settling rate.
28 ppm of active polymer is added and mixed in slurry in one step.
28 ppm of active polymer is added and mixed in slurry in two step - 18 ppm addition followed by 10 ppm addition.
LMW is a low molecular weight polymer comprising 57 mole percent acrylamide and 43 mole percent hydrolyzed acrylamide with molecular weight of about 600,000.
HMW is a high molecular weight polymer comprising 95 mole percent acrylamide and 5 mole percent hydrolyzed acrylamide with molecular weight of about 10 million.
H2SO4 is sulfuric acid.
N.M. denotes that the particular property is not measurable.
A is a low molecular weight polymer of 75 mole percent acrylic acid linkages and 25 mole percent acrylamide linkages with a molecular weight between 100,000 and 250,000 sold commercially as Cyanamid Aerofloc 550.
B is a high molecular weight polymer of 5 mole percent acrylic acid linkages and 95 mole percent acrylamide linkages with a molecular weight between 5 and 8 million cold commercially as Cyanamid Superfloc 1128.

The data in Table II indicates that the order of addition of the three critical sets of components is important in obtaining good flocculation and clarification. Sample No. C-12, in which the inorganic coflocculant is employed before the low molecular weight polymer, is not considered an example of this invention due to the fact that an insufficient amount of flocculant treating agent is employed.

EXAMPLE 3

Coal/clay suspensions are dispersed in water as described in Example 1. Slurry A is prepared and tested as described in Sample Nos. 11 and 12 of Table III. Slurry A is 12 to 18 percent coal and clay solids having a pH of 7.1 to 7.5 at a temperature of 135° F. to 150° F.

Slurry B is prepared and tested as described in Sample Nos. 13 to 17. Slurry B is 7 to 10 percent coal and clay solids having a pH of 8.0 to 8.3 at a temperature of 148° F.

Each of the polymer flocculants is diluted to a concentration of 0.1 percent (active polymer weight) and allowed to equilibrate. The polymer flocculants and inorganic coflocculant are added to a coal liquor sample and tested as in Example 1. Data concerning settling rate, clarity and compaction is presented in Table III.

TABLE III

| Sample No. | Polymer A Molecular weight | Polymer A Percent Hydrolysis | Polymer A Dosage (ppm) | Inorganic Coflocculant (ppm) | Polymer B Molecular Weight | Polymer B Percent Hydrolysis | Polymer B Dosage (ppm) | Percent Light Trans. @ 5 min. | Settling Rate (in/min.) | Compaction (in.) | Performance |
|---|---|---|---|---|---|---|---|---|---|---|---|
| 13 | 1 million | 42 | 80 | 80 (Alum) | 10 million | 5 | 80 | 73 | 3.43 | 6.1 | 4.77 |
| 14 | 0.6 million | 43 | 80 | 80 (Alum) | 10 million | 5 | 80 | 65 | 3.27 | 6.5 | 4.09 |
| 15 | 0.6 million | 43 | 20 | 2000 (H2SO4) | 10 million | 0 | 40 | 85 | 2.1 | 5.74 | 11.8 |
| 16 | 0.6 million | 43 | 20 | 2000 (H2SO4) | 10 million | 5 | 40 | 69 | 4.4 | 3.34 | 13.9 |
| 17 | 0.6 million | 43 | 20 | 2000 (H2SO4) | 10 million | 10 | 40 | 30 | 4.6 | 2.99 | 6.4 |
| 18 | 0.6 million | 42 | 23 | 550 (H2SO4) | 10 million | 5 | 18 | 82 | 2.75 | 2.5 | 23.9 |
| 19 | 0.6 million | 42 | 23 | 733 (H2SO4) | 10 million | 5 | 18 | 94 | 2.5 | 2.75 | 21.1 |

The data in Table III illustrates the good flocculation and clarification achieved using the process of this invention. The data indicates that a high amount of anionic character in the high molecular weight polymer is not desirable (i.e. Sample No. 17).

What is claimed is:

1. A process for flocculation of a colloidal coal slurry wherein a coal liquor is contacted with a clarifying amount of flocculant treating agents comprising:
(A)
  (1) a water-soluble, low molecular weight polymer comprising in polymerized form about 35 to about 45 mole percent of the anionic equivalent of hydrolyzed acrylamide and from about 55 to about 65 mole percent of a nonionic monomer, which polymer is first contacted with said coal liquor, and
  (2) an inorganic coflocculant which is then contacted with said coal liquor, wherein
  the amount of said inorganic coflocculant is sufficient to increase the flocculating capability of said polymer; and the amount of said polymer and the anionic character thereof are such that a flocculating capability is provided, and
(B) a further clarifying amount of a water-soluble, high molecular weight polymer having a nonionic or weakly anionic character comprising in polymerized form a nonionic, water-solobule monomer and, optionally at least one water-soluble monomer containing an anionic moiety with which the coal liquor is then contacted.

2. A process for the flocculation of a colloidal coal slurry wherein a coal liquor is contacted with a clarifying amount of a flocculant treatment comprising:
(A)
  (1) from about 0.5 to about 120 weight parts per million weight parts of coal liquor, an active polymer having a molecular weight of from about 500,000 to about 1,500,000 and having a substantially high anionic character comprising in polymerized form at least one nonionic water-soluble monomer and at least one water-soluble monomer containing an anionic moiety, wherein the anionic character is such that the nonionic monomer comprises from about 55 to about 80 mol percent of said polymer, which polymer is first contacted with said coal liquor, and (2) from about 100 to about 2000 weight parts per million weight parts of coal liquor of an inorganic coflocculant which is then contacted with said coal liquor, wherein the amount of said inorganic coflocculant is sufficient to increase the flocculating capability of said polymer; and the amount of said polymer and anionic character thereof are such that flocculating capability is provided, and (B) a further clarifying amount of from about 0.5 to about 120 weight parts per million weight parts of coal liquor of a water-soluble, polymer having a molecular weight in excess of about 5 million and having a nonionic or weakly anionic character comprising in polymerized form at least one nonionic, water-soluble monomer and at least one water-soluble monomer containing an anionic moiety such that said nonionic monomer comprises from about 90 to about 100 mole percent of said polymer with which the coal liquor is then contacted.

3. A process of Claim 2 wherein the clarifying amount of said low molecular weight polymer ranges from 16 to about 30 weight parts per million weight parts of coal liquor; the clarifying amount of said inorganic coflocculant ranges from 100 to about 1600 weight parts per million weight parts of coal liquor; and the clarifying amount of said high molecular weight polymer ranges from about 30 to about 60 weight parts per million weight parts of coal liquor.

4. A process of Claim 2 wherein the molecular weight of said low molecular weight polymer ranges from about 500,000 to about 1,000,000.

5. A process of Claim 2 wherein the molecular weight of said low molecular weight polymer ranges from about 600,000 to about 750,000.

6. A process of Claim 2 wherein the molecular weight of said high molecular weight polymer ranges from about 8 to about 15 million.

7. A process of Claim 2 wherein said low molecular weight polymer comprises in polymerized form about 30 to about 45 mole percent of the anionic equivalent of hydrolyzed acrylamide and from about 55 to about 70 mole percent of a nonionic monomer.

8. A process of Claim 2 wherein said high molecular weight polymer comprises in polymerized form from about 4 to about 7 mole percent monomer containing anionic moiety and from about 93 to about 96 mole percent nonionic monomer.

9. A process of Claim 2 wherein the coal liquor contains from about 0.25 to about 50 weight percent of total solids.

10. A process of Claim 9 wherein said total solids comprise coal particles and colloidal size clay particles.

* * * * *